US00H002109H1

(19) United States

(12) Statutory Invention Registration (10) Reg. No.: US H2109 H

Tsui et al. (43) Published: Sep. 7, 2004

(54) PASSIVE MICROWAVE DIRECTION FINDING WITH MONOBIT FOURIER TRANSFORMATION RECEIVER AND MATRIX COUPLED ANTENNA

(75) Inventors: James B. Y. Tsui, Dayton, OH (US); Keith M. Graves, Springfield, OH (US)

(73) Assignee: The United States of America as represented by the Secretary of the Air Force, Washington, DC (US)

(21) Appl. No.: 10/115,819

(22) Filed: Apr. 3, 2002

(51) Int. Cl.[7] ..... G01S 7/495

(52) U.S. Cl. ..... 342/442; 342/373; 342/443; 342/444; 342/445; 342/196; 342/20

(58) Field of Search ..... 242/368, 373, 242/376, 442, 443, 444, 445, 196, 13; 708/403–409; 702/77, 196–197, FOR 108, FOR 168

(56) References Cited

U.S. PATENT DOCUMENTS

| | | | |
|---|---|---|---|
| 3,255,450 | A | 6/1966 | Butler |
| 3,517,309 | A | 6/1970 | Gerst |
| 3,731,217 | A | 5/1973 | Gerst et al. |
| 4,203,114 | A | 5/1980 | Gerst et al. |
| 4,231,040 | A | 10/1980 | Walker |
| 4,424,500 | A | 1/1984 | Viola et al. |
| 4,604,626 | A | 8/1986 | Stromswold |
| 5,373,299 | A | 12/1994 | Ozaki et al. |
| 5,568,154 | A | 10/1996 | Cohen |
| 5,691,728 | A | 11/1997 | Goetz et al. |
| 5,917,737 | A | 6/1999 | Tsui et al. |
| 5,963,164 | A | 10/1999 | Tsui et al. |

OTHER PUBLICATIONS

Telecommunications: Glossary of Telecommunications Terms, Federal Standard 1037C, p. V–2, Aug. 1996.*

J. Butler and R. Rowe, "Beam Forming Matrix Simplifies Design of Electronically Scanned Antennas", Electronic Design, 1961, pp. 170–173, vol. 9.

J.P. Shelton and K.S. Kelleher, "Multiple Beams from Linear Arrays", IRE Transactions on Antennas and Propagation, Mar. 1961, pp. 154–161.

S.E. Lipsky, *Microwave Passive Direction Finding*, 1987, John Wiley and Sons, New York, NY, p. ix–xvii, 126–137, 150, 260–261, 295.

J.B.Y. Tsui, *Microwave Receivers with Electronic Warfare Applications*, 1986, John Wiley and Sons, New York, NY, p. ix–xv, 229, 279, 330.

* cited by examiner

*Primary Examiner*—Daniel T. Pihulic

(74) *Attorney, Agent, or Firm*—Gerald B . Hollins; Thomas L. Kundert

(57) ABSTRACT

A passive instantaneous microwave signal frequency identifying and angle of arrival identifying system employing a beam steering multiple element antenna coupled through a Butler matrix to a plurality of simplified Fourier transformation radio receivers wherein unit value or near unit value magnitudes of the Kernel function $$e^{\frac{-j2\pi kn}{N}}$$

in the receivers' Fourier transformations are used to elude transformation computation complexity and resulting radio receiver size and cost penalties. Limiting amplifiers, a video signal path and direction finding encoding logic are also employed. Airborne military application of the system in electronic warfare direction finding, radar frequency determination and other activities is included.

22 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

PASSIVE MICROWAVE DIRECTION FINDING WITH MONOBIT FOURIER TRANSFORMATION RECEIVER AND MATRIX COUPLED ANTENNA

RIGHTS OF THE GOVERNMENT

The invention described herein may be manufactured and used by or for the Government of the United States for all governmental purposes without the payment of any royalty.

BACKGROUND OF THE INVENTION

When a military aircraft flying in unknown or hostile air space is discovered by a distant radar apparatus it is often beneficial for the crew of the aircraft to not only be made aware of the occurrence of this radar discovery but to also be appraised of as much information regarding the discovering radar as is possible. Two significant portions of this discovering radar information are the physical location of and the operating frequency of the distant radar apparatus. In addition to the fundamental act of receiving such information concerning the discovering radar apparatus it is desirable that this information become available to the aircraft crew as quickly as is possible and that the information be obtained from as little as one pulse of energy received from a threat signal source. The obtaining of this and other information such as pulse duration and signal strength data in a passive non-signal radiating manner from a distant threat signal is the role of the electronic warfare radio receiver.

The radio receiver arrangement we have identified by the name of a "monobit receiver" offers an attractive basis for fabricating such an electronic warfare receiver and for solving several problems arising in the electronic warfare and other military electronics fields of endeavor. One group of such problems is locating the source of a distant radio frequency emission from a single pulse of received radio frequency energy emission i.e., providing a radio frequency direction finding capability that is usable in the present day passive monopulse electronic signal environment. Although radio receivers technically capable of performing in this direction finding and frequency identification environment have existed for some time the cost, technical complexity and physical size of each such existing receivers and related problems such as relatively short intervals of mean time between receiver failure events have limited the practicality of direction finding apparatus using existing electronic warfare receivers. This limitation is especially notable with respect to locating such apparatus within the confines of and within the weight limitations of a host aircraft such as a tactical or fighter aircraft.

It has been clear to persons working in the monopulse systems technical field that a passive instantaneous direction finding apparatus built around a multiple element directive antenna having elements coupled through a phase responsive network such as a Butler matrix to a plurality of individual radio receivers would be within the realm of technical possibility except for the penalty of cost, technical complexity and physical size associated with each of the individual radio receivers needed to embody such a system. Indeed persons working in this field have proposed such direction finding and frequency identification systems in considerable detail. One such system is for example disclosed in the 1996 U.S. Pat. No. 5,568,154 of Yakov Cohen of Haifa, Israel. The Cohen '154 patent indeed involves a frequency and direction finding system inclusive of a multiple element directional antenna, a Butler matrix and radio receivers assembled into a combination providing first blush similarity to the system of the present invention.

A more detailed consideration of the Cohen direction finding and frequency identification system reveals however the use of several radio receivers of one of the types identified as "channelized receivers, Bragg cell receivers, compressive receivers (and) digital FFT receivers", see column 1, line 19 of the Cohen patent. Five of a selected one of such receiver types are included at 122–130 of the Cohen patent's exemplary FIG. 1 direction finding system drawing. When the cost, technical complexity and physical size associated with each of these previous receiver types is considered, the limited utility of the resulting Cohen FIG. 1 system, particularly in a small aircraft, begins to emerge however. The inventors of the present invention have used receivers of these previous types in experimental laboratory work and in fact one of the present inventors has authored a published text book in which both technical characteristics and physical embodiment photographs of individual receivers of this type appear. See the Text "Microwave Receivers With Electronic Warfare Applications" authored by James Bao-Yen Tsui, published by John Wiley and Sons, copyright 1986. Photographs of circa mid 1980's versions of receivers of these channelized receivers, Bragg cell receivers, compressive receivers and digital FFT receiver types appear on pages 229, 330, 279 and 183 respectively in the Tsui text. From these photographs the physicalsize portion of the difficulties attending a system according to the Cohen patent, using five or more of such receivers, becomes apparent. In the interest of simplifying and shortening the present document nevertheless the contents of both the Cohen patent and the Tsui text are hereby incorporated by reference herein. At the very least these documents provide enlightening background and signal characteristics information. Another text providing helpful background information with respect to the present invention is the text "Microwave Passive Direction Finding" authored by Stephen E. Lipsky, also published by John Wiley and Sons, and copyright 1987. The Lipsky text is also hereby incorporated by reference herein.

A significant part of the difficulty with the previous digital FFT receivers heretofore potentially used in monopulse frequency and direction-finding applications relates to the algorithm used to embody the Fourier transformation operation in the receiver. Most Fourier transformation realizations necessarily include an extensive use of numeric multiplication in computing values related to the kernel function portion, $$e^{\frac{-j2\pi kn}{N}},$$

i.e., the exponential of "e" the base of the natural logarithm, within the Fourier transformation algorithm. Both the number of and the size of each individual of these multiplications contributes to the complexity of rigorously implementing the Fourier transformation in either hardware or software form and especially to the difficulty of implementing this operation in real time. In an effort to reduce this complexity one of the present invention inventors, James B.Y. Tsui and a number of colleagues, have shown that Fourier transformation Kernel functions of unit magnitude or substantially unit magnitude may be used to successfully approximate a true Kernel function value and enable the realization of a Fourier transformation using only multiplication by unity or in essence no multiplication in the Fourier transformation computation algorithm. Kernel function realization in this manner is disclosed in a first U.S. Patent of Tsui et al., a patent numbered U.S. Pat. No. 5,917,737, wherein Kernel function values are located on a circle of unit radius at angular locations of $\pi/4$, $3\pi/4$, $5\pi/4$ and $7\pi/4$ radians.

A later patent document involving inventor Tsui and colleagues wherein the Kernel function values are moved on the circle of unit radius to locations of 0, $\pi 2$, $\pi$, and $3\pi/2$ radians is identified as U.S. Pat. No. 5,963,164. In a yet later patent document, the U.S. patent application identified with Ser. No. 09/944,616 and filed on Sep. 4, 2001, inventor Tsui and a colleague have demonstrated advantages available when Kernel function values located at each of the $\pi/4$, $3\pi/4$, $5\pi/4$ and $7\pi/4$ radian locations are added to the Kernel function values at 0, $\pi/2$, $\pi$, and $3\pi/2$ radians with the added four values being slightly increased in magnitude from unit circle values and in fact having a magnitude of $(2)^{1/2}$ or 1.414.

The incentive for improving the Kernel function approximations over that of the earlier U.S. Pat. No. 5,917,737 patent is ease of realizing the approximation in the transition of the U.S. Pat. No. 5,917,737 patent to that of the U.S. Pat. No. 5,963,164 patent and a desire for improved receiver signal amplitude tolerance or dynamic range response enhancement in the serial number instance. The FIG. 4 drawing herein shows the eight unit value-related Kernel function approximation locations disclosed in the Ser. No. 09/944,616, Sep. 4, 2001 application in graphic form and also demonstrates Kernel function locations usable in the present invention. These same eight Kernel function locations are also used in the invention of U.S. patent application of Ser. No. 10/008,476, applicants' attorneys docket number AFD 481, filed in Dec. 2001.

Notwithstanding the previous attribute of having a somewhat limited two tone dynamic range characteristic the monobit receiver using limited Kernel function values is nevertheless believed an attractive arrangement for use in a passive microwave frequency direction finding system. Additional improvements and performance enhancements currently under investigation for this receiver suggest the possibility of even greater attraction to the monobit receiver configuration for direction finding use. The relatively low cost, small physical size and simplicity of any version of this monobit receiver are especially seen as welcome additions to the currently available selection between for example the channelized receivers, Bragg cell receivers, compressive receivers (and) digital FFT receivers identified in the Cohen patent document. The possibility that such a monobit receiver can be realized on a single integrated circuit chip especially makes a direction finder of the present invention type a realistic possibility and moreover greatly enhances the prospect of this apparatus being sufficiently small and light in weight as to enable its use in even a small military aircraft. Such a direction finder is the area of interest in the present invention. The direction finder of the present invention can of course also be used in other settings including use in connection with an unattended ground sensor or an unmanned air vehicle.

SUMMARY OF THE INVENTION

The present invention provides a simplified, small size, passive, instantaneous- operation, microwave direction finding and microwave signal frequency identification system.

It is therefore an object of the present invention to provide a simplified, small size, passive, instantaneous-operation, microwave direction finding and microwave signal frequency identification system that is based on a simplified unit value related approximation of the Fourier transformation Kernel function $$e^{\frac{-j2\pi kn}{N}}.$$

It is another object of the invention to provide a microwave direction finding and microwave signal frequency identification system that is compatible with use in a tactical military aircraft.

It is another object of the invention to provide a microwave direction finding and microwave signal frequency identification system that may be of selected accuracy and complexity.

It is another object of the invention to provide a microwave direction finding and signal frequency identification system in which the number of Fourier transformation receivers may be selected.

It is another object of the invention to provide a microwave direction finding and signal frequency identification system in which the number of receiving antenna elements and the system resolution capability may be selected.

These and other objects of the invention will become apparent as the description of the representative embodiments proceeds.

It is another object of the invention to provide a microwave direction finding and signal frequency identification system that may be used in both military and civilian endeavors.

These and other objects of the invention are achieved by the passive method of identifying both operating frequency and relative angular location of a distant source of microwave radio frequency radiant energy with respect to a receiving location, said method comprising the steps of:

receiving, in multiple elements of a circular disposed omni directional microwave antenna located in said receiving location, multiple antenna element samples of energy radiated from said distant source of microwave radio frequency radiant energy;

coupling electrical signals, generated by said received radiated energy in each of said circular disposed omni directional microwave antenna elements, through a mode forming electrical matrix to phase segregated multiple output ports of said mode forming electrical matrix;

communicating each of said mode forming electrical matrix phase segregated multiple output port electrical signals to a separate monobit electronic warfare radio receiver of substantially unit value Fourier transformation Kernel function $$e^{\frac{-j2\pi kn}{N}}$$

realization and signal phase angle preserving characterization;

determining, from Fourier transformation of each said communicated phase segregated multiple output port electrical signal in one of said monobit electronic warfare radio receivers, a predominant signal frequency component of said energy radiated from said distant source of microwave radio frequency radiant energy;

ascertaining, from phase decoding of Fourier transformations of multiple of said communicated, phase segregated, multiple output port electrical signals from said electronic warfare radio receivers, an angle of arrival vector, with respect to said receiver location, for said energy radiated from said distant source of microwave radio frequency radiant energy.

BRIEF DESCRIPTION OF THE DRAWING

The accompanying drawings incorporated in and forming a part of the specification, illustrate several aspects of the present invention and together with the description serve to explain the principles of the invention. In the drawings.

DETAILED DESCRIPTION OF THE INVENTION

Figure 1:
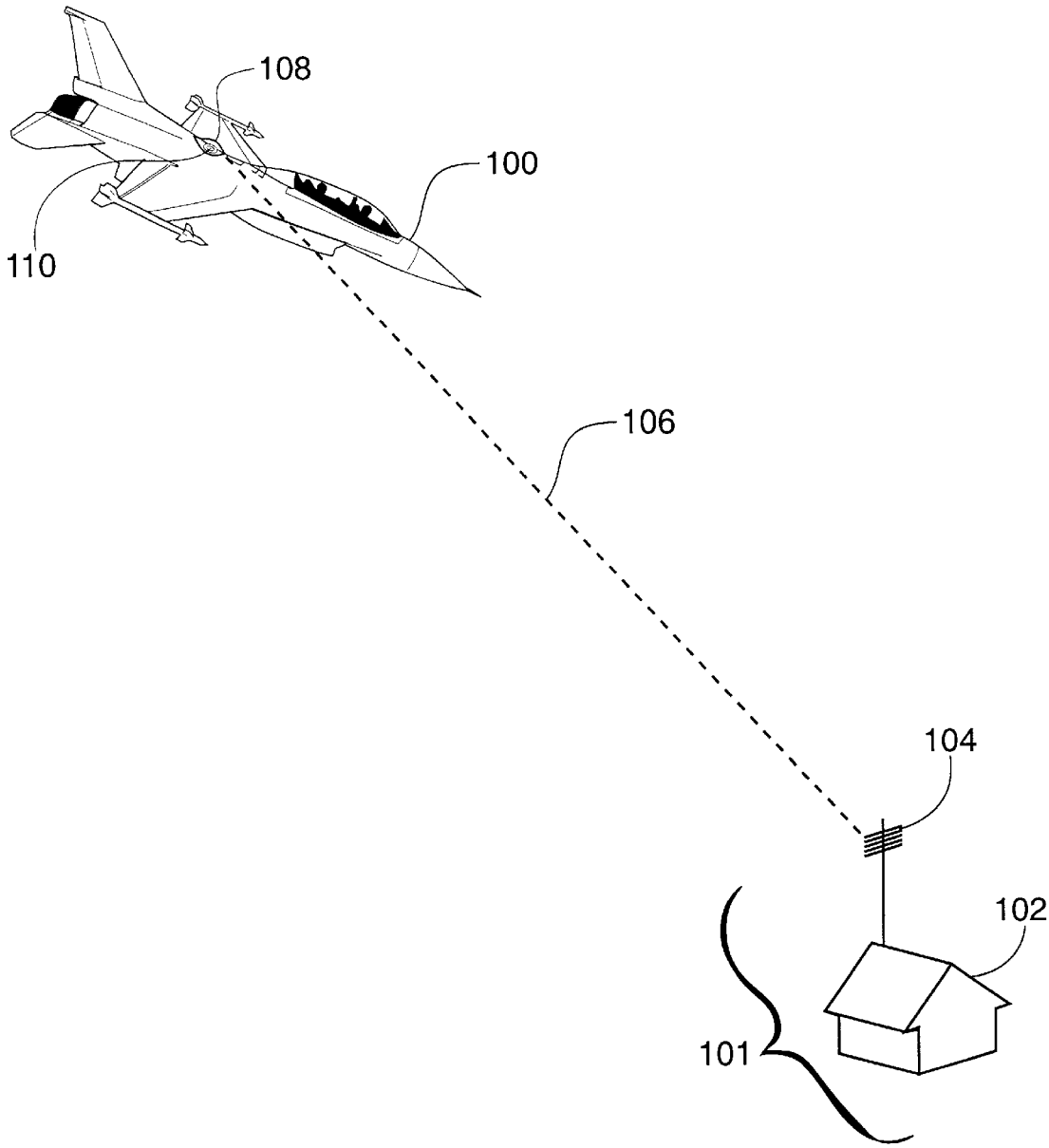
FIG. 1 shows a military scene possibly involving the present invention.

FIG. 1 in the drawings shows a military scene in which a direction finding and signal frequency-determining system according to the present invention may be used. In the FIG. 1 scene a tactical military aircraft 100 has ventured into the operating range of a ground based radar system 101 located in the building 102 and operating by way of an electronically steerable antenna array 104. The radar apparatus 101 may be of a long-range search nature or of a shorter-range weapons directing type. The radar system 101 is transmitting and receiving pulses of microwave radio frequency energy along a path 106 between the antenna 104 and the aircraft 100. A portion of the energy transmitted from antenna 104 is reflected by the aircraft 100 back to the antenna 104 and provides the signal by which the radar system 101 is viewing the aircraft 100.

Of interest with respect to the present invention, another portion of this FIG. 1 transmitted radar energy is received in a circular-configured microwave antenna 110 housed within a radome 108 both of which are disposed on a suitable external portion of the aircraft 100. By way of this antenna 110-received microwave radio frequency energy, it is desirable for the crew of the aircraft 100 to be appraised of both the occurrence of the FIG. 1 represented radar lock-on and also be informed of the operating frequency and possibly other operating details concerning the radar system 101. Such informing is of course useful in confirming that the radar system 101 is indeed non friendly for example and can also alert the aircraft crew as to the searching or tracking nature of the radar and thus of the immediate possibility of incoming threat weapons. Preferably such appraisal is formulated within the duration of the first pulse of radio frequency energy received from the radar system 101 or in response to this first pulse of energy or at least within a short system-delayed response to this first pulse. This is especially important if the threat signal is of short duration, is difficult to intercept or if the threat system is moving. The radar system 101 may also represent a system mounted on a vehicle including another aircraft, a system which again may be of a search or a tracking nature.

The aircraft-mounted antenna represented at 110 in FIG. 1 is preferably of an omni directional and multiple signal elevation angle reception type in order to assuredly and efficiently receive incoming signals from any possible location around the aircraft 100. Additional details of an antenna suitable for use in the location 110 are disclosed in the paragraphs following and especially in connection with the FIG. 5 drawing herein. One aspect of the desired antenna is that it be comprised of a plurality of elements each having a principle boresight axis extending in small angular azimuth disposition with respect to the similar axis of adjacent elements. This directivity characteristic may be supplemented with steering or beamforming action.

Figure 2:
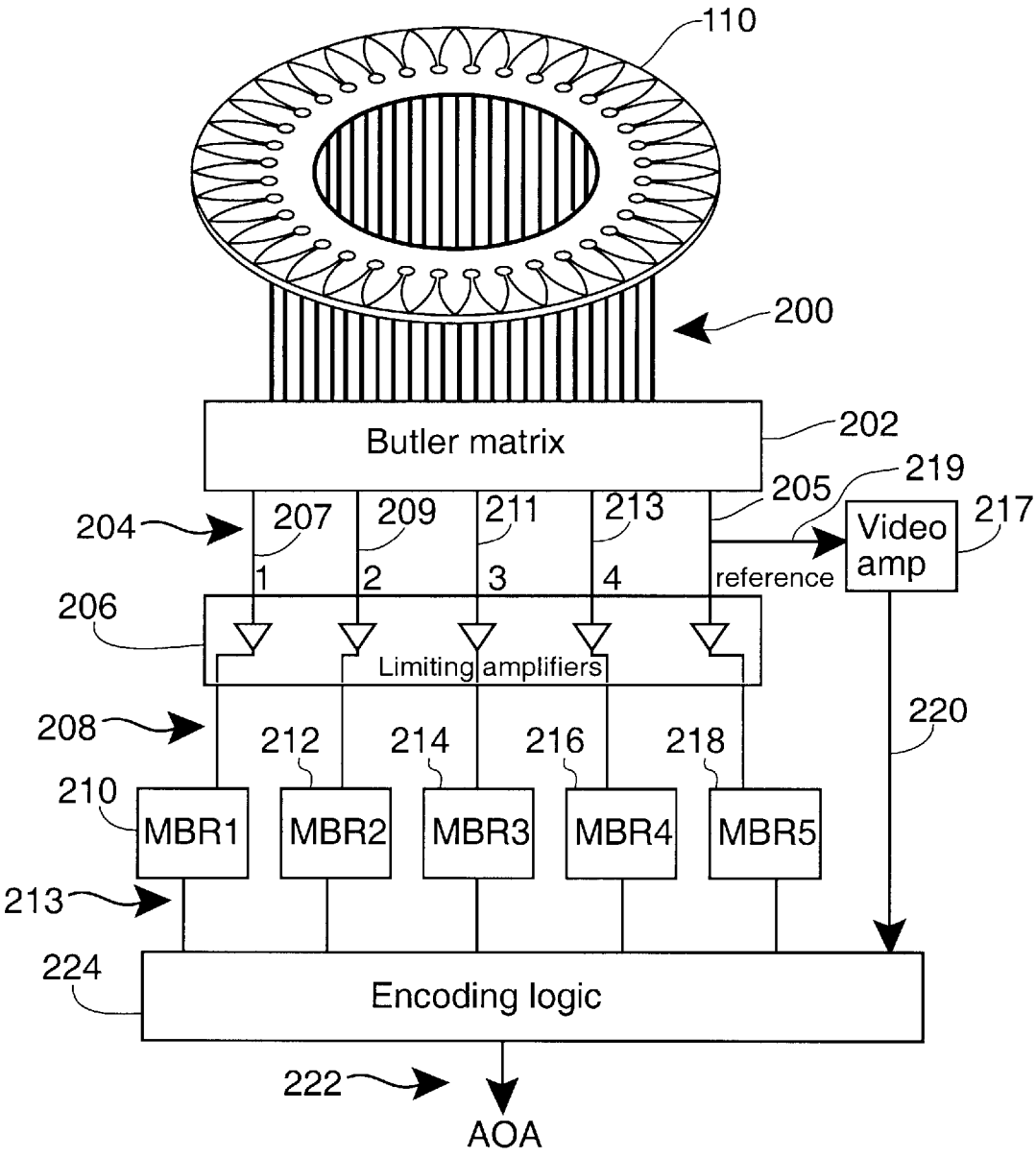
FIG. 2 shows details of a present invention direction finding and signal frequency- determining system usable in the FIG. 1 scene.

FIG. 2 In the drawings shows the antenna 110 of the FIG. 1 aircraft 100 together with a block diagram of a direction finding and signal frequency-determining system according to the present invention. In the FIG. 2 drawing the antenna 110 is connected by way of a plurality of transmission line elements 200, such as coaxial transmission lines, with the first block 202 of the FIG. 2 system. Each element of the antenna 110 connects with a different one of the transmission lines 200 and each transmission line 200 connects with a separate input node of the block 202. The FIG. 1 and FIG. 2 antenna and its corresponding structure in the FIG. 5 drawing may be described as having a sunflower petal-like arrangement of sensing elements that are disposed on an electrically insulating substrate and applied to a surface portion of the aircraft 100.

The use of an electrical network or an electrical matrix, as is embodied in the block 200 in FIG. 2, to couple signals between the elements of a beamforming antenna array and a signal generating or signal using apparatus is now often practiced in the radio frequency electronic art. One of the most desirable network arrangements for performing this beamforming signal coupling function is known by the name of a "Butler Matrix" i.e., an array of interconnected microwave radio frequency signal processing elements usually inclusive of power dividers, phase shifters and hybrids of plural varieties. A Butler Matrix is often arranged to have a differing number of signal input and signal output ports one number of ports being equal to the number of antenna elements and the other number being equal to the number of ports of the transmitting or receiving apparatus coupled to the system antenna. Such electrical networks or matrices are also identified as modeformers and may be said to mathematically relate antenna signals and electrical mode signals according to a selected mathematical relationship, i.e., a complex mathematical matrix. By way of an electrical network, or a matrix such as the Butler Matrix, the output energy of a radio frequency transmitter for example may be divided into phase related portions suitable for energizing the different elements of a multiple element antenna array to produce for example a beam of radiated energy directed in one specific azimuth and elevation-defined direction with respect to the antenna array. An opposite similar function is performed in the case of a radio receiver system using a Butler Matrix with signals from each azimuth direction around the antenna being converted to electrical waveforms of a unique phase relationship.

A similar function, of perhaps more relevance in the present direction finding invention setting, is performed by such a matrix during energy reception by the antenna system with signals from each azimuth direction around the system being converted to electrical waveforms of a unique phase relationship. Thus energy received by multiple elements in the FIG. 2 antenna array 110 is so combined in phase and amplitude at the output ports of the matrix 202 that identification of the direction of arrival of the received energy with respect to the antenna array elements is possible. An early description of the Butler Matrix preferred for this use is found in the published article "Beam Forming Matrix Simplifies Design of Electronically Scanned Antennas" authored by J. Butler and R. Lowe and said to appear in the journal "Electronic Design" volume 9, pages 170–173, 1961. Another published article concerning the Butler Matrix is titled "Multiple Beam on Linear Arrays" authored by J.P. Shelton and K.S. Kelleher and appearing in the Institute of Radio Engineers, Transactions on Antennas and Propagation, March 1961.

Figure 3:
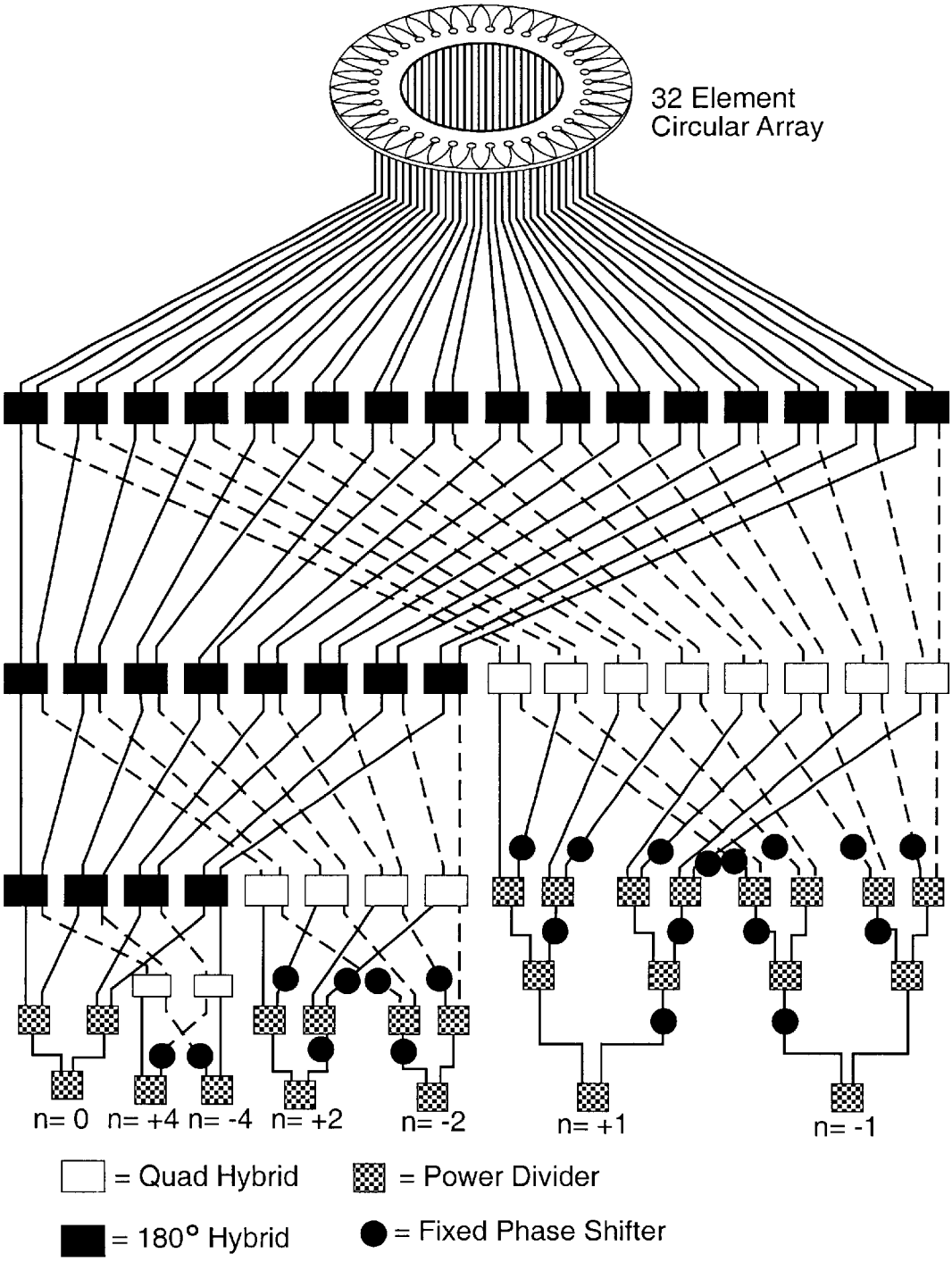
FIG. 3 shows additional details of a Butler Matrix usable in the FIG. 2 system.

Additional descriptive material concerning the Butler Matrix is to be found in a number of U.S. patents including the U.S. Pat. No. 3,255,450 patent of J.L. Butler, the U.S. Pat. No. 3,517,309 patent of C.W. Gerst et al., the U.S. Pat. No. 3,731,217 patent of C.W. Gerst et al., the U.S. Pat. No. 4,231,040 patent of S.H. Walker, the U.S. Pat. No. 4,424,500 patent of R.D. Viola et al., the U.S. Pat. No. 5,373,299 patent of E.T. Ozaki et al., and the U.S. Pat. No. 5,691,728 patent of A.C. Goetz et al. Schematic drawings and related text concerning a Butler Matrix appear in the above-identified Tsui text at page 108 and 109 and in the above-identified Lipsky text commencing at page 132 and also at page 169. Each of the patent publication and textbook references identified herein is also hereby incorporated by reference herein. A schematic drawing of a 32 element Butler Matrix and its connected antenna additionally appears as FIG. 3 herein.

Continuing with discussion of the FIG. 2 direction finding and signal frequency-determining system, the phase related signals developed in the Butler Matrix 202 thus have differing phase relations according to the direction of or the angle of arrival of the signals from the radar system 101 in FIG. 1. Each new Butler Matrix output signal at 204 in fact comprises a signal representing the angular relationship between the aircraft 100 and the radar system 101. The data on the reference path 205 is for example of a coarse angular relationship nature and may be viewed as being one angular signal manifestation appearing in a no signal background while the data on the path 207 represents the input data with double the resolution of the path 205 data and with two signal representations against the background; i.e., with two ambiguities. In a similar manner the signals on the paths 209, 211 and 213 represent input data with successively doubled degrees of resolution but doubled number of ambiguities. By decoding these signals in combination, as accomplished in the block 224 of FIG. 2, an accurate non-ambiguous indication of the angle of arrival of the signal along path 106 with respect to the aircraft 100 is provided at the system output port 222. The number of signals employed at locations 204, 208 and 213 in the present invention may be selected and may of course differ from the five signals represented in the FIG. 2 drawing in simpler or more complex arrangements of the invention.

In the block 206 of FIG. 2 there is located a plurality of limiting amplifier circuits used to condition the phase related signals appearing at 204 on the output paths 207, 209, 211, 213and 205 of the Butler Matrix in block 202. These limiting amplifier circuits improve the accuracy of the FIG. 2 system by increasing the amplitude of each signal at 204 to such degree that only the zero crossings or other manifestations of signal phase remain discernable in the limiting amplifier output signal. Amplifier circuits that are driven into saturation are commonly used for embodiment of limiting amplifiers as represented in block 206. Cost limited lower performance arrangements of the FIG. 2 system may possibly omit the amplifiers of block 206 with the realization that resulting angle of arrival determinations can be less accurate especially in the instance of weaker input signals.

The output signals of the limiting amplifiers of block 206 appear collectively at 208 and are applied to the respective individual monobit receivers 210, 212, 214, 216 and 218 in the FIG. 2 system embodiment. Fundamentally the monobit receivers 210, 212, 214, 216 and 218 serve to determine the Fourier transformation or the frequency components of each signal applied along the paths at 208. These frequency components clearly identify the signal being received by the FIG. 2 system by its component parts and thereby implement the signal identification function desired from the system. For search speed enhancement and superior frequency resolution it is desired that each monobit receiver 210, 212, 214, 216 and 218 have as many frequency channels as are needed to cover the desired bandwidth of the system, a bandwidth of about 1 gigahertz being desirable for the overall FIG. 2 system. Individual channels in the receivers 210, 212, 214, 216 and 218 are desirably rather narrow, of about 10 megahertz bandwidth, in order to segregate signals separated by more than 10 megahertz in the provided signal identification. Other bandwidths and resolutions are however possible.

As indicated earlier herein the radio receivers 210, 212, 214, 216and 218 may be embodied in the form of several possible receiver types however for the present airborne and reasonable cost and complexity system the use of the monobit microwave receiver (MBR) described in the identified patents originating in our same laboratory and involving inventor J.B.Y. Tsui is considered preferable. This receiver employs the unit value approximated Kernel function in a discrete Fourier transformation realization and is thereby of considerably reduced complexity and physical size with respect to the other receivers usable at 210, 212, 214, 216 and 218 in the FIG. 2 system. The monobit receiver has somewhat limited two tone instantaneous dynamic range, a characteristic resulting in the FIG. 2 system processing only the stronger of two signals that are separated by more than five dB of signal strength. If two incoming signals are of signal strength within five dB of each other the monobit receiver can report one or more frequencies correctly and under most simultaneous signal conditions does not generate erroneous frequency information as other receivers do. The simultaneous signal condition is found to be better resolved by the monobit receiver of the present invention than by other possible receivers.

Since the monobit receiver is based on the discrete Fourier transformation the received phase relationships are maintained in the receivers 210, 212, 214, 216 and 218 and the discrete Fourier transformation outputs are complex quantities. In these output signals phase relationships may be determined from the relationship:

$$\phi=[\text{Imaginary}(X(k))/\text{Real}(X(k))] \quad (1)$$

where X(k) is the kth frequency component.

In the FIG. 2 described system each of the five illustrated phase channels is preferably arranged to be capable of reporting one hundred frequency outputs. As shown in the FIG. 6 with a representative input signal an output signal appears at the same frequency channel for each of the five receivers at 210, 212, 214, 216 and 218 in the FIG. 2 system. The vertical scales in the FIG. 6 drawings represent signal amplitude, i.e., an amplitude that may be determined from the relationship:

$$\text{Amplitude}=\{[\text{Imaginary}(X(k))]^2+[\text{Real}(X(k))]^2\}^{1/2} \quad (2)$$

The equation 2 relationship indicates only the location of a signal because in the present invention the input is. hard limited by the limiting amplifiers shown at 206 in FIG. 2 and therefore does not provide accurate amplitude information. In other words changes in receiver input signal magnitude are not accurately reflected at the output of the limiting amplifiers 206 in view of such limiting action. Nevertheless however such an input signal does generate an output signal having real and imaginary components which sum in the manner indicated by equation 2 to provide some form of an output signal. The maintenance of phase relationship in the monobit receiver however enables the comparison of phase among the five phase channels to produce the desired angle of arrival data from the multiple simultaneous signals. The described system therefore provides frequency and angle of arrival information from multiple simultaneous signals. In the system, frequency information is obtained through the monobit receivers and angle of arrival information is obtained from the combination of the Butler matrix and the circular antenna array.

At 224 in the FIG. 2 system is shown the encoding logical circuitry serving to obtain at 222 one angle of arrival value from the five monobit receiver phase output signals at 213. This encoding logic performs the phase angle to angle of arrival conversion function using the signal from the fifth monobit receiver 218 as a reference signal. The output of each other monobit receiver is compared to this reference signal to obtain the described signals of differing resolution and degrees of ambiguity. According to this arrangement each monobit receiver measures the same signal and reports it frequency. By using multiple receivers and comparing their outputs to the reference the multiple results are used to determine what is ambiguous and select the non-ambiguous.

The signal paths 219 and 220 and the video amplifier 217 in the FIG. 2 system provide a conveyance by which a video signal from one Butler Matrix output port reaches the encoding logic of block 224. The encoding logic of block 224 includes both frequency discrimination and selection logic to identify signals of interest. The encoding logic 224 also includes a phase comparison function that is preferably disposed in software form. Threshold logic also in the encoding logic of block 224 can additionally determine the frequencies and direction of other simultaneous signals within a given margin such as ten megahertz resolution; such resolution depends on tradeoffs and system needs including sampling speed, memory, hardware size, discrete Fourier transform length, logic complexity and hardware size.

Figure 4:
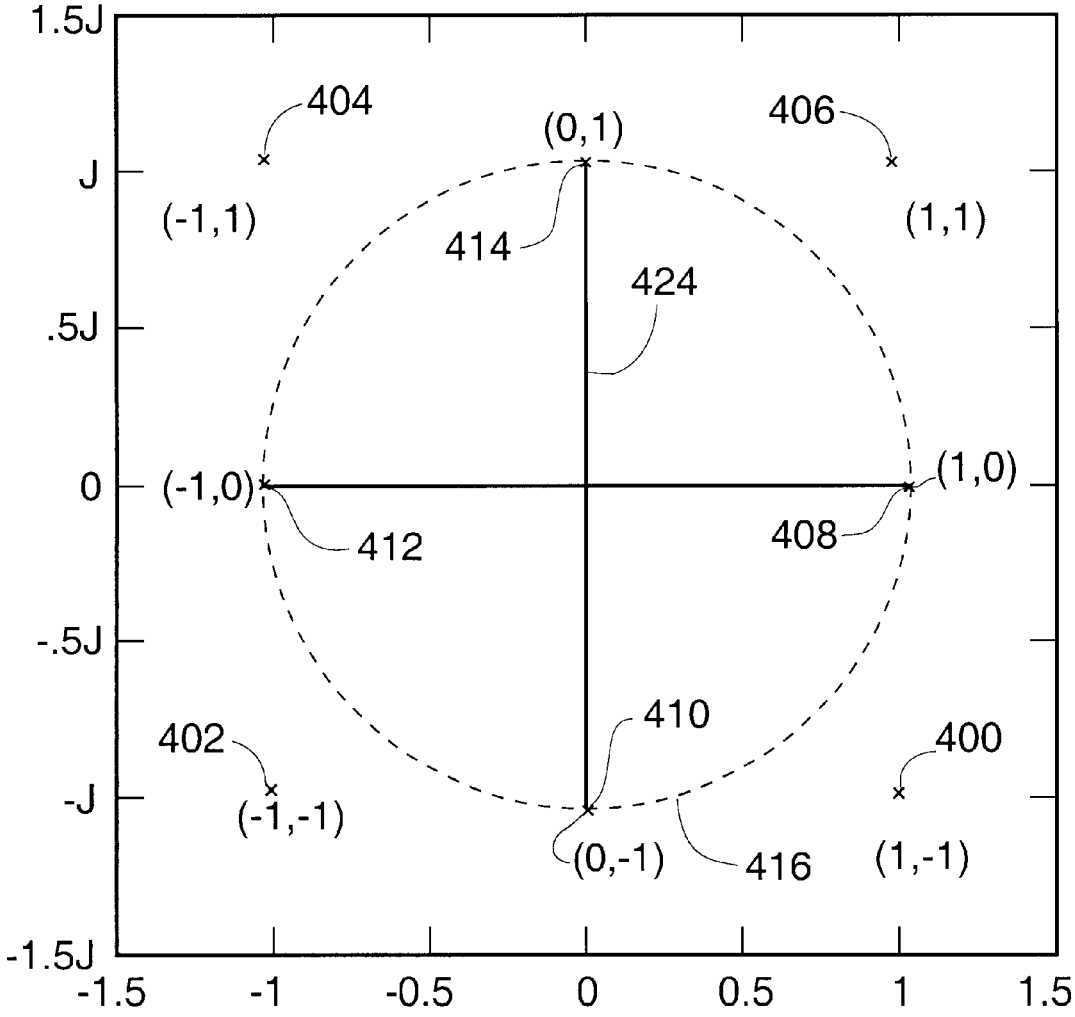
FIG. 4 shows Kernel function approximations usable in the FIG. 2 system.

FIG. 4 in the drawings shows the Kernel function locations preferred for use in the approximated Fourier transformation of the present invention. The FIG. 4 drawing originates as FIG. 2 in one of the above identified and incorporated by reference herein previous U.S. patent applications involving inventor J. B. Y. Tsui and colleagues, the application of Ser. No. 09/944,616. In the FIG. 4 drawing four Kernel function values of precisely unit magnitude length appear at 408, 410, 412 and 414 and four Kernel function values of actually 1.414 magnitude, a magnitude that can be successfully regarded as also having unit length are shown at 400, 402, 404 and 406. As is disclosed in the Ser. No. 09/944,616 application the combination of these FIG. 4 eight Kernel function values is found to provide an approximate Kernel function realization achieving increased instantaneous dynamic range and possibly other benefits with respect to a monobit receiver using either of two previously disclosed four value Kernel function approximations. The present invention is of course not limited to the FIG. 4 Kernel function values and may be used with either of the four unit value Kernel function approximations or other approximations. In the present document the various approximation Kernel function values of unity or near unity magnitude are referred-to as having substantially unit value.

Figure 5:
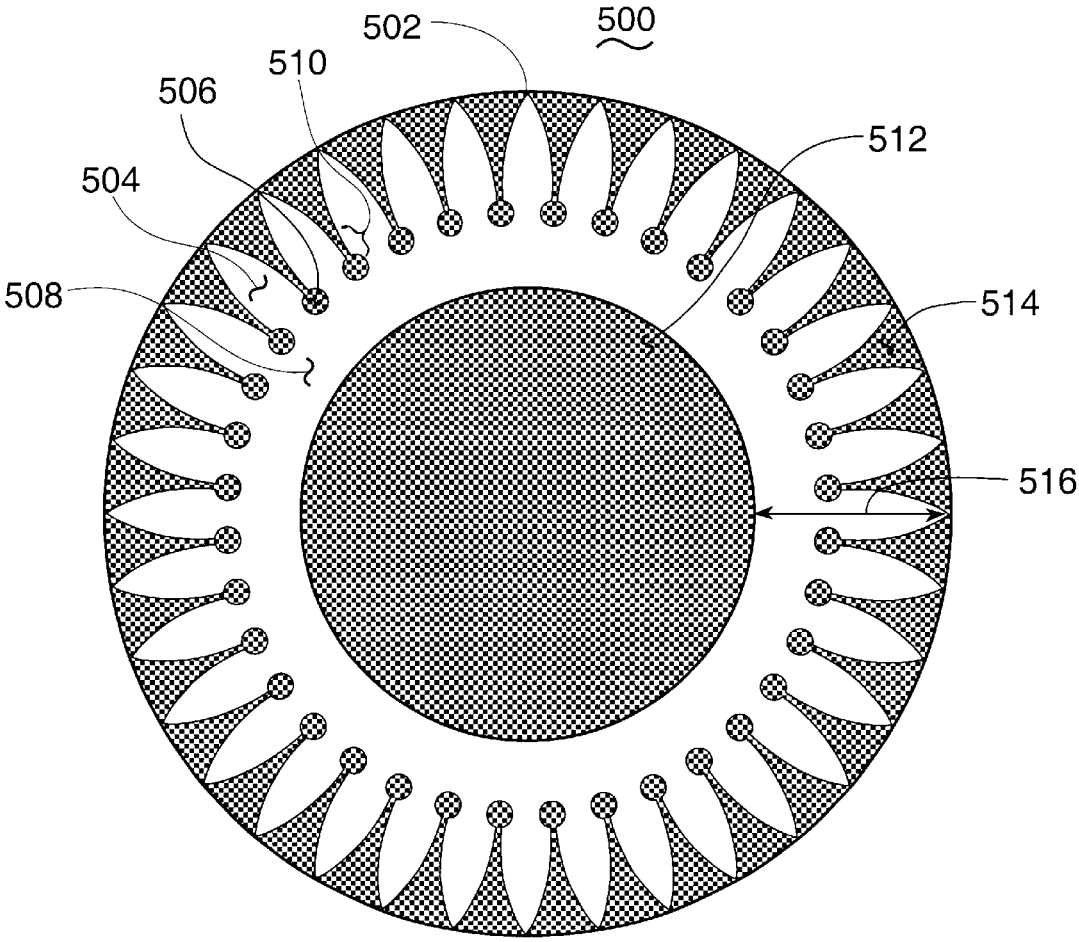
FIG. 5 shows a circular microwave antenna of a type usable in the FIG. 2 system.

The arrangement shown in FIG. 5 is representative of an antenna system usable with the present invention. The FIG. 5 antenna system 500 may be fabricated on an insulating substrate material, as appears at 512 and 514 in FIG. 5; such materials as the plastic- impregnated woven cloth or other electrical insulating sheet stock including the fiberglass duroid material, may be used. Antennas of this type are also available from suppliers such as Anaren Microwave Corporation of New York, USA. The FIG. 5 antenna system includes a total of thirty-two individual antennas or elements as are represented by the typical elements 502 and 504. The FIG. 5 system is shown slightly enlarged, is actually of some three and thirteen sixteenths inches or nine and seven tenths centimeters overall diameter and is comprised of individual elements of seven eighths of an inch or two and two tenths centimeters length as are disposed annularly in angular separations of 360/32 or 11.25 degrees; other separations such as ten degrees are also possible depending on the size, number and placement of the elements.

The FIG. 5 antenna system is feasible for use with a direction finding arrangement of the present invention type, a system operating for example in the frequency range of ten gigahertz. At the innermost end of each element of the FIG. 5 antenna system is disposed an impedance matching transformer having the appearance of a hole 506 received in the typical copper antenna conductor material 508, a hole disposed between adjacent roots of the typical sunflower petal-like antenna elements 502 and 504. Coaxial cable transmission lines connect to each element of the FIG. 5 antenna at the narrow air gap region 510 just external of the matching transformer holes 506. In this connection arrangement each element terminates its own coaxial cable center conductor and the surrounding shield conductor of an adjacent element.

The foregoing description of the preferred embodiment of the present invention has been presented for purposes of illustration and description. It is not intended to be exhaustive nor to limit the invention to the precise form disclosed. Obvious modifications or variations are possible in light of the above teachings. The embodiment was chosen and described to provide illustration of the principles of the invention and its practical application and to thereby enable one of ordinary skill in the art to utilize the invention(s) in various embodiments and with various modifications as are suited to the scope of the invention determined by the appended claims when interpreted in accordance with the breadth to which they are fairly, legally and equitably entitled.

We claim:

1. The real time passive digital method of identifying both operating frequency and relative angular location of a distant source of microwave radio frequency radiant energy with respect to a receiving location, said method comprising the steps of:

receiving, in multiple elements of a circular disposed omni directional microwave antenna located in said receiving location, multiple antenna element samples of energy radiated from said distant source of microwave radio frequency radiant energy;

coupling electrical signals, generated by said received radiated energy in each of said circular disposed omni directional microwave antenna elements, through a mode forming electrical matrix to phase segregated multiple output ports of said mode forming electrical matrix;

communicating each of said mode forming electrical matrix phase segregated multiple output port electrical signals to a separate real time monobit electronic warfare radio receiver of substantially unit value real time digital Fourier transformation Kernel function $$e^{\frac{-j2\pi kn}{N}}$$

realization and signal phase angle preserving characterization;

determining, from real time digital Fourier transformation of said communicated phase segregated multiple output port electrical signal in one of said monobit electronic warfare radio receivers, a predominant signal frequency component of said energy radiated from said distant source of microwave radio frequency radiant energy; and ascertaining, from phase decoding of digital Fourier transformations of multiple of said communicated, phase segregated, multiple output port electrical signals in said electronic warfare radio receivers, an angle of arrival vector, with respect to said receiver location, from said energy radiated from said distant source of microwave radio frequency radiant energy.

2. The real time passive digital method of identifying operating frequency and relative angular location of a distant source of microwave radio frequency radiant energy of claim 1 wherein said receiving location is disposed on a moving aircraft and said distant source of microwave radio frequency radiant energy comprises one of an airborne and a ground disposed radar system.

3. The real time passive digital method of identifying operating frequency and relative angular location of a distant source of microwave radio frequency radiant energy of claim 1 further including the step of dispersing said circular disposed omni directional microwave antenna elements into a flower petal-like array of individually signal output port-coupled elements.

4. The real time passive digital method of identifying operating frequency and relative angular location of a distant source of microwave radio frequency radiant energy of claim 1 wherein said coupling step is comprised or transferring said electrical signals through a mode forming Butler Matrix.

5. The real time passive digital method of identifying operating frequency and relative angular location of a distant source of microwave radio frequency radiant energy of claim 1 wherein said step of communicating each of said mode forming electrical matrix phase segregated multiple output port electrical signals to a separate monobit electronic warfare radio receiver of near unit value real time digital Fourier transformation Kernel function $$e^{\frac{-j2\pi kn}{N}}$$

includes a Kernel function of exactly unit value.

6. The real time passive digital method of identifying operating frequency and relative angular location of a distant source of microwave radio frequency radiant energy of claim 1 wherein said step of communicating each of said mode forming electrical matrix phase segregated multiple output port electrical signals to a separate monobit electronic warfare radio receiver of near unit value real time digital Fourier transformation Kernel function $$e^{\frac{-j2\pi kn}{N}}$$

includes a Kernel function of magnitude equal to the square root of two.

7. The real time passive digital method of identifying operating frequency and relative angular location of a distant source of microwave radio frequency radiant energy of claim 1 wherein said determining step further includes real time digital Fourier transformation of each said communicated phase segregated multiple output port electrical signal in a separate one of said monobit electronic warfare radio receivers and multiple determinations of a predominant signal frequency component of said energy radiated from said distant source of microwave radio frequency radiant energy.

8. The real time passive digital method of identifying operating frequency and relative angular location of a distant source of microwave radio frequency radiant energy of claim 1 further including the step of communicating signals from an output path of said mode forming electrical matrix to a signal input path of an angle of arrival computation.

9. The real time passive digital method of identifying operating frequency and relative angular location of a distant source of microwave radio frequency radiant energy of claim 1 further including processing output signals of said mode forming electrical matrix in a saturating amplitude limiting circuit.

10. The real time passive digital method of identifying operating frequency and relative angular location of a distant source of microwave radio frequency radiant energy of claim 1 wherein said step of ascertaining an angle of arrival vector from phase decoding of digital Fourier transformations of multiple of said communicated, phase segregated, multiple output port electrical signals includes decoding a plurality of said phase segregated, multiple output port electrical signals each of different phase resolution and signal ambiguity characteristics.

11. Distant microwave signal source real time digital frequency identification and relative angular position-determination airborne tactical aircraft apparatus comprising the combination of:

a circular disposed multiple element microwave antenna member mounted in a microwave energy signal reception location of a host tactical aircraft;

a plurality of transmission line members each connecting between a feed point- location in one element of said multiple element microwave antenna member and an antenna signal output port;

a signal phase responsive beamforming electrical network having a plurality of signal phase processing elements disposed in an interconnected repetitive electrical matrix, said electrical matrix including an input port connected with said antenna signal output port transmission lines and an output port having a lesser number of microwave energy signal phase related output paths;

a plurality of Fourier transformation real time digital microwave frequency radio receivers each of substantially unit value-realized $$e^{\frac{-j2\pi kn}{N}}$$

Kernel function character, and having input port connection with one of said signal phase responsive electrical network signal phase related output paths;

said Fourier transformation real time digital microwave frequency radio receivers each also having constant input and output signal phase relationships and having digital output signals representative of Fourier components comprising said distant source of microwave radio frequency radiant energy operating frequencies; and signal phase responsive angle of arrival determination apparatus connected with each digital output signal of said Fourier transformation microwave frequency radio receiver and with an angle of arrival output signal port of said airborne apparatus.

12. The distant microwave signal source real time digital frequency identification and relative angular position-determination tactical aircraft apparatus of claim 11 further including a plurality of signal amplitude limiter elements each connected intermediate one of said signal phase processing elements of said signal phase responsive electrical network and an input path of one of said Fourier transformation real-time digital microwave frequency radio receivers.

13. The distant microwave signal source real time digital frequency identification and relative angular position-determination airborne tactical aircraft apparatus of claim 11 further including a signal amplifier having a signal input port connected with one of said microwave energy signal phase related output paths of said repetitive matrix and a signal output port connected with an input port of said signal phase responsive angle of arrival determination apparatus.

14. The distant microwave signal source real time digital frequency identification and relative angular position-determination airborne apparatus of claim 11 wherein said signal phase responsive electrical network comprises a Butler Matrix.

15. The distant microwave signal source real time digital frequency identification and relative angular position-determination airborne apparatus of claim 14 wherein said Butler Matrix includes a plurality of microwave hybrid, microwave signal power divider and microwave signal phase shifter elements.

16. The distant microwave signal source real time digital frequency identification and relative angular position-determination airborne apparatus of claim 14 wherein said Butler Matrix includes means for generating a plurality of phase related output signals each of differing and unit integer phase angle multiple relationships.

17. The distant microwave signal source real time digital frequency identification and relative angular position-determination airborne apparatus of claim 14 further including a reference signal path connected between an output port of said Butler Matrix and a video reference signal input node of said signal phase responsive angle of arrival determination apparatus.

18. The distant microwave signal source real time digital frequency identification and relative angular position-determination airborne apparatus of claim 11 wherein said transmission line members each comprise a length of coaxial cable.

19. The distant microwave signal source real time digital frequency identification and relative angular position-determination airborne apparatus of claim 11 wherein said circular disposed multiple element microwave antenna member is comprised of circularly arrayed microwave frequency antenna elements located in a sunflower petal-like relationship on an electrical insulation substrate received in a surface portion of said tactical aircraft.

20. The distant microwave signal source real time digital frequency identification and relative angular position-determination airborne apparatus of claim 11 wherein said Fourier transformation real time digital microwave frequency radio receivers each include digital Fourier transformation apparatus of two hundred fifty-six data points and substantially one hundred nanoseconds cycle time characteristics.

21. The real time passive digital method of identifying both operating frequency and relative angular location of a distant source of microwave radio frequency radiant energy of claim 1 wherein said step of communicating each of said mode forming electrical matrix phase segregated multiple output port electrical signals to a separate real time monobit electronic warfare radio receiver of substantially unit value real time digital Fourier transformation Kernel function $$e^{\frac{-j2\pi kn}{N}}$$

realization includes a two hundred fifty-six data points digital Fourier transformation of substantially one hundred nanoseconds cycle time.

22. The real time passive digital method of identifying both operating frequency and relative angular location of a distant source of microwave radio frequency radiant energy of claim 21 wherein said step of communicating each of said mode forming electrical matrix phase segregated multiple output port electrical signals to a separate real time monobit electronic warfare radio receiver of substantially unit value real time digital Fourier transformation kernel function $$e^{\frac{-j2\pi kn}{N}}$$

realization includes a two hundred fifty-six data points digital Fourier transformation of one hundred two and four-tenths nanoseconds cycle time.

* * * * *